(12) United States Patent
Schaeffer et al.

(10) Patent No.: US 11,120,021 B2
(45) Date of Patent: Sep. 14, 2021

(54) SYSTEMS AND METHODS FOR OPTIMIZING QUERIES

(71) Applicant: Facebook, Inc., Menlo Park, CA (US)

(72) Inventors: Kevin Alan Schaeffer, San Francisco, CA (US); Wojciech Galuba, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 339 days.

(21) Appl. No.: 15/404,118

(22) Filed: Jan. 11, 2017

(65) Prior Publication Data
US 2018/0196850 A1 Jul. 12, 2018

(51) Int. Cl.
*G06F 16/00* (2019.01)
*G06F 16/2453* (2019.01)

(52) U.S. Cl.
CPC .. *G06F 16/24539* (2019.01); *G06F 16/24542* (2019.01)

(58) Field of Classification Search
None
See application file for complete search history.

(56) References Cited

U.S. PATENT DOCUMENTS

| | | | | |
|---|---|---|---|---|
| 9,183,253 | B2 * | 11/2015 | Hacigumus | G06F 16/24539 |
| 10,191,967 | B2 * | 1/2019 | Belghiti | G06K 9/6223 |
| 10,565,179 | B2 * | 2/2020 | Brunel | G06F 16/282 |
| 2009/0006346 | A1 * | 1/2009 | C N | G06F 16/24542 |
| 2012/0173519 | A1 * | 7/2012 | Buessow | G06F 16/24539 |
| | | | | 707/722 |
| 2013/0117257 | A1 * | 5/2013 | Meijer | G06F 16/2453 |
| | | | | 707/719 |
| 2015/0227631 | A1 * | 8/2015 | Legrand | G06F 17/30867 |
| | | | | 707/722 |
| 2015/0379080 | A1 * | 12/2015 | Jochimski | G06F 17/30339 |
| | | | | 707/600 |
| 2016/0378808 | A1 * | 12/2016 | Hopcroft | G06F 17/30336 |
| | | | | 707/745 |
| 2017/0316055 | A1 * | 11/2017 | Chen | G06F 17/30442 |

* cited by examiner

*Primary Examiner* — Debbie M Le
(74) *Attorney, Agent, or Firm* — Sheppard Mullin Richter & Hampton LLP

(57) ABSTRACT

Systems, methods, and non-transitory computer-readable media can receive a query that includes at least one operation for aggregating data stored in one or more database tables. A determination is made that at least a portion of the data being aggregated by the operation has been pre-computed. The query is optimized so that the operation uses the pre-computed data when executed.

19 Claims, 7 Drawing Sheets

SYSTEMS AND METHODS FOR OPTIMIZING QUERIES

FIELD OF THE INVENTION

The present technology relates to the field of query optimization. More particularly, the present technology relates to techniques for optimizing database queries.

BACKGROUND

Today, people often utilize computing devices (or systems) for a wide variety of purposes. Users can operate their computing devices to, for example, interact with one another, create content, share content, and access information. Under conventional approaches, users can run various queries that are processed by one or more database management systems. Such queries may reference various operations and data (e.g., schemas, tables, views, etc.) to be used for processing the queries.

SUMMARY

Various embodiments of the present disclosure can include systems, methods, and non-transitory computer readable media configured to receive a query that includes at least one operation for aggregating data stored in one or more database tables. A determination is made that at least a portion of the data being aggregated by the operation has been pre-computed. The query is optimized so that the operation uses the pre-computed data when executed.

In an embodiment, the operation for aggregating data corresponds to an average function, a count function, a maximum function, a minimum function, a median function, a sum function, or a union function.

In an embodiment, the systems, methods, and non-transitory computer readable media are configured to generate an intermediate representation of the query and modify the intermediate representation of the query to reference the pre-computed data.

In an embodiment, the intermediate representation of the query corresponds to an abstract syntax tree that describes the query, and wherein one or more nodes in the abstract syntax tree are modified to reference the pre-computed data.

In an embodiment, the systems, methods, and non-transitory computer readable media are configured to generate a translated version of the query for execution by a given SQL query engine.

In an embodiment, the translated version of the query corresponds to an Apache Hive query or a Presto query.

In an embodiment, the data was pre-computed in response to a threshold number of previous queries having aggregated the same data.

In an embodiment, the data was pre-computed in response to one or more previous queries that aggregated the data requiring at least a threshold amount of time to execute.

In an embodiment, the data was pre-computed in response to the data being aggregated by one or more scheduled queries.

In an embodiment, the systems, methods, and non-transitory computer readable media are configured to determine that a cost estimate for running the query satisfies a threshold value and prevent the query from being executed.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
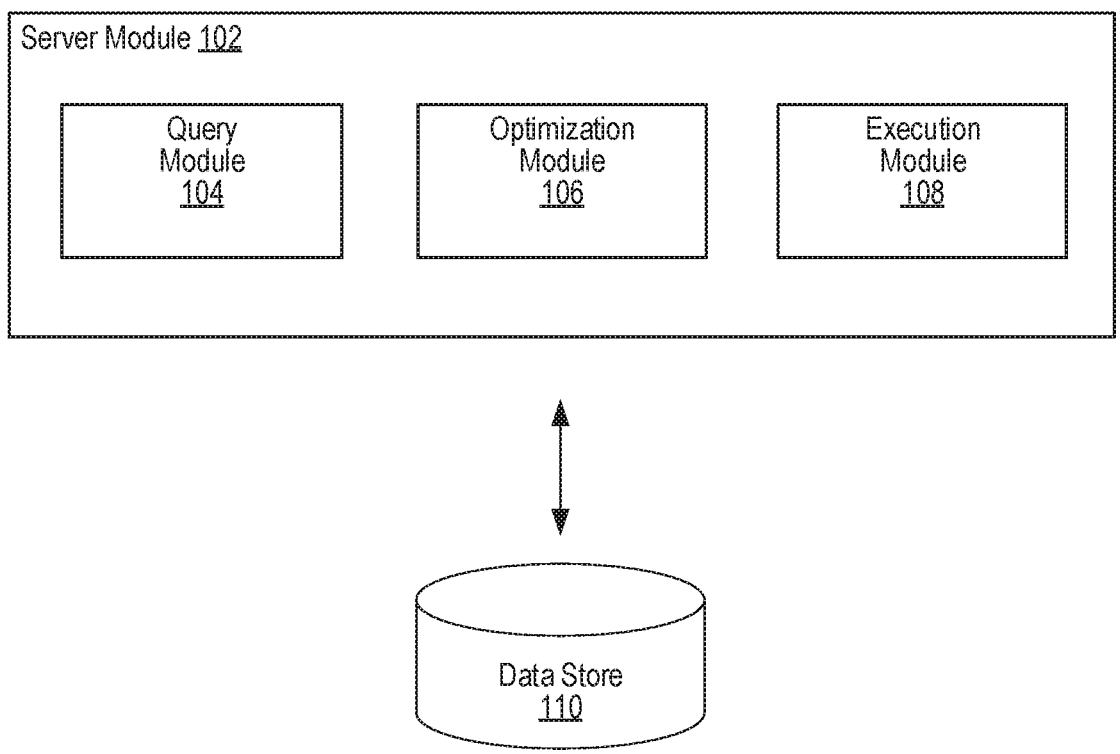
FIG. 1 illustrates an example system including an example server module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Optimizing Queries

People often utilize computing devices (or systems) for a wide variety of purposes. Users can operate their computing devices to, for example, interact with one another, create content, share content, and access information. Under conventional approaches, users can run various queries that are processed by one or more database management systems. A query may reference various database operations and data (e.g., schemas, tables, views, etc.) to be used when processing the query. Conventionally, queries may be optimized to improve certain operations such as a join ordering. These existing approaches, however, generally do not optimize the use of data being utilized by the queries. Accordingly, such conventional approaches may not be effective in addressing these and other problems arising in computer technology.

An improved approach overcomes the foregoing and other disadvantages associated with conventional approaches specifically arising in the realm of computer technology. In various embodiments, queries can be optimized to use pre-computed data. In some embodiments, various data can be pre-computed and stored automatically due to popularity and/or based on previously submitted queries. For example, a query may specify one or more database operations for aggregating data (e.g., union, sum, count, average, etc.) and data (e.g., database tables, columns, etc.) on which the database operations are to be performed. In some embodiments, such queries can be converted to an intermediate representation (e.g., abstract syntax tree). The intermediate representation of the query can be evaluated to identify any data (e.g., table data) that has already been pre-computed. The intermediate representation of the query can be modified to use pre-computed data as appropriate. In some embodiments, the intermediate representation of the query can be translated for execution by a given SQL query engine.

FIG. 1 illustrates an example system 100 including an example server module 102, according to an embodiment of the present disclosure. As shown in the example of FIG. 1, the server module 102 can include a query module 104, an optimization module 106, and an execution module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the server module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the server module 102 can be implemented, in part or in whole, as software running on one or more computing devices or systems, such as on a user computing device or client computing system. For example, the server module 102, or at least a portion thereof, can be implemented as or within an application (e.g., app), a program, or an applet, etc., running on a user computing device or a client computing system, such as the user device 610 of FIG. 6. Further, the server module 102, or at least a portion thereof, can be implemented using one or more computing devices or systems that include one or more servers, such as network servers or cloud servers. In some instances, the server module 102 can, in part or in whole, be implemented within or configured to operate in conjunction with a social networking system (or service), such as the social networking system 630 of FIG. 6. It should be understood that there can be many variations or other possibilities.

In some embodiments, the server module 102 can be configured to communicate and/or operate with the at least one data store 110 in the example system 100. The at least one data store 110 can be configured to store and maintain various types of data. In various embodiments, the at least one data store 110 can store data relevant to the function and operation of the server module 102. One example of such data includes various data that has been pre-computed. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data. It should be appreciated that there can be many variations or other possibilities.

In various embodiments, the query module 104 can be configured to receive requests for various data. For example, a user operating a computing device may submit a request for aggregating certain data that is being managed by the server module 102. The request may be submitted over an interface (e.g., web interface) and/or application programming interface (API), for example. In one example, the request may seek a respective duration of time that users spent interacting with a content provider. The request may also specify that the results be grouped by a given attribute (e.g., geographic location, type of computing device, etc.). In some instances, the request can also specify various database operations to be performed on specified data. For example, the request may specify one or more aggregation operations (e.g., union, sum, count, average, etc.) to be performed using the specified data. In some embodiments, such requests are formatted using a query language, e.g., the Structured Query Language (SQL). In one example, an aggregation operation (or function) is an operation where the values of multiple rows are grouped together as input on certain criteria to form a single value.

In some embodiments, the optimization module 106 can process the received request to identify opportunities for using data that has been pre-computed (or pre-aggregated). For example, the request may specify that the respective durations of time that users spent interacting with a content provider be averaged by country. In this example, the optimization module 106 can determine whether such data has already been pre-computed. If such data has been pre-computed, the optimization module 106 can automatically modify the request to use the pre-computed data rather than performing the operations needed to again compute the same data. Once the request has been optimized, the optimization module 106 can generate one or more queries for execution by various platforms (or SQL query engines). More details regarding the optimization module 106 are provided below in reference to FIG. 2.

In some embodiments, the execution module 108 can be configured to execute queries generated by the optimization module 106. As mentioned, in some embodiments, these queries may be translated for execution on a particular platform (or SQL query engine). In some embodiments, the execution module 108 provides one or more of these queries to the appropriate platform for execution. Any resulting output generated by the platform can be returned to the execution module 108. In such embodiments, the execution module 108 can provide the output to the user through the interface.

Figure 2:
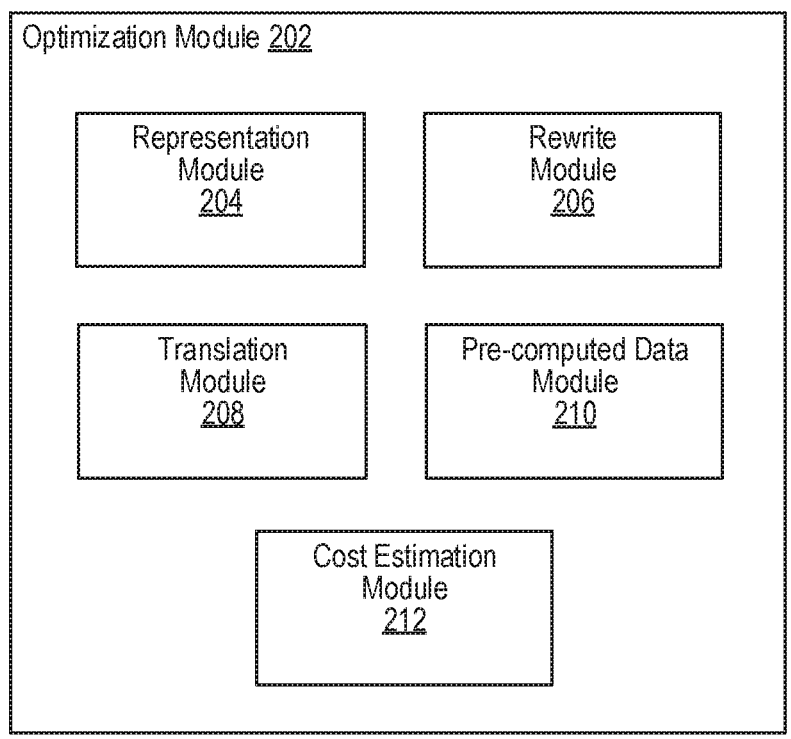
FIG. 2 illustrates an example of an optimization module, according to an embodiment of the present disclosure.

FIG. 2 illustrates an example of an optimization module 202, according to an embodiment of the present disclosure. In some embodiments, the optimization module 106 of FIG. 1 can be implemented with the optimization module 202. As shown in the example of FIG. 2, the optimization module 202 can include a representation module 204, a rewrite module 206, a translation module 208, a pre-computed data module 210, and a cost estimation module 212.

In some embodiments, the representation module 204 is configured to generate an intermediate representation for any requests that were received. As mentioned, a request can specify one or more database operations and data on which the operations are to be performed. For example, the request may specify one or more aggregation operations to be performed using data stored in one or more database tables. In some embodiments, the representation module 204 generates an abstract syntax tree (AST) that is a tree representation of the request. For example, the representation module 204 can utilize a parser to generate an abstract syntax tree that represents the code (e.g., SQL code) provided by the request. This parser may be implemented using generally known techniques for converting source code to an abstract syntax tree. In general, the abstract syntax tree is composed of nodes that each denote a construct occurring in the code provided by the request. A node, therefore, may correspond to a particular operation (e.g., aggregation operation) specified in the code or some data (e.g., database table), for example.

In some embodiments, the rewrite module 206 is configured to evaluate the abstract syntax tree generated for the request to identify opportunities for optimizing the request to use pre-computed data. When evaluating the abstract syntax tree, the rewrite module 206 can traverse the abstract syntax tree to identify nodes that correspond to operations for aggregating various data. Some examples of such aggregation operations include union, sum, count, average, to name some examples. For example, the rewrite module 206 may identify a set of nodes that correspond to an operation for averaging the respective durations of time that users spent interacting with a content provider by country. In this example, the rewrite module 206 can determine whether such data has already been pre-computed. If such data has been pre-computed, the rewrite module 206 can automatically modify the abstract syntax tree to use the pre-computed data (e.g., modify the nodes to reference the pre-computed data) rather than performing the operations needed to again compute the same data.

There may be instances in which no pre-computed data is available for a given operation. In such instances, the rewrite module 206 can leave the portion of the abstract syntax tree that corresponds to such operations intact so that these operations are performed upon execution. In some instances, when pre-computed data is not available, the rewrite module 206 can opt to modify the pre-computed data for a given operation. For example, if a given operation aggregates data over some period of time (e.g., data corresponding to a time period from 8 am to 5 pm on a given day) that is different from the period of time over which the data was pre-computed (e.g., data corresponding to a time period from 8 am and 8 pm on the given day), then the rewrite module 206 can automatically subtract a portion of the data that is not needed by the operation (e.g., data corresponding to a time period from 5 pm to 8 pm time period on the given day). As a result, the operation can still be performed using pre-computed data that has been modified for the operation.

In some instances, there may be multiple versions of pre-computed data that can be used to process a given operation. For example, an operation may request aggregation of data over some time period (e.g., Sunday through Saturday or one full week). In this example, pre-computed versions of the data that were aggregated on a per-day basis may be available. Additionally, pre-computed versions of the data that were aggregated on a per-week basis may also be available. Here, the rewrite module 206 can automatically determine the best version of pre-computed data to use for the operation. In this example, rather than using seven different versions of data that were pre-computed on a per-day basis (one version for each day of the week), the rewrite module 206 can optimize the abstract syntax tree to use the pre-computed data for the entire week.

In some embodiments, the translation module 208 can be configured to translate the optimized code (e.g., SQL code) to a query that can be executed on a specified platform (e.g., SQL query engine). Such query translations may be specified in the request. For example, in some embodiments, the translation module 208 can translate the optimized code into a query that can be executed by a platform implementing Apache Hive. In some embodiments, the translation module 208 can translate the optimized code into a query that can be executed by a Presto SQL query engine.

In various embodiments, the pre-computed data module 210 can be configured to pre-compute data based on various criteria and at various time intervals (e.g., hourly, nightly, weekly, etc.). For example, in some embodiments, data that was aggregated in response to a threshold number of queries can be identified as data to be pre-computed. In this example, subsequent queries requesting the same data can be optimized to use the pre-computed version of the same data. In some embodiments, data that was aggregated in response to one or more queries that required at least a threshold amount of time (e.g., threshold number of milliseconds, seconds, etc.) to execute (or queries that were slow to execute) can be pre-computed. In this example, subsequent queries requesting the same data can be optimized to use the pre-computed version of the same data. In some embodiments, data (e.g., database tables) that is accessed a threshold number of times over some period of time (e.g., hourly, nightly, weekly, etc.) can be pre-computed for use by subsequent queries. In some embodiments, scheduled queries that are executed at predefined times (e.g., cron jobs) can be identified. In such embodiments, any data relied upon by such queries can be pre-computed in advance so that the speed at which such queries are executed can be improved. In some embodiments, the decision to pre-compute data is based on a respective cardinality of any database table columns being used by a query.

In various embodiments, the cost estimation module 212 is configured to determine a cost of running a query prior to actually running the query. For example, the cost can be a function of the expected system load when executing the query (or one or more operations in the query) and/or the time needed to execute the query (or one or more operations in the query). In some embodiments, the cost is estimated based on scanning various types of data (e.g., number of rows, number of columns, or both) when running a query. For example, a small time range for one or more database tables referenced in a given query can be selected. In this example, a respective number of rows in the tables can be estimated for the time range using pre-calculated counts to produce an estimated cost for the query. In some embodiments, a cost for a query that includes one or more "group by" clauses can be estimated based on a number of distinct values (or estimated number of distinct values) in a given column of a database table that is used in the "group by" operation. In some embodiments, historically observed costs of queries can be used to train a machine learning model for predicting query costs. In some embodiments, historically observed costs of queries can be used to create a linear regression model. In some embodiments, queries can be queued for execution based on their respective costs. For example, queries having at least a threshold cost can be ordered and placed in a queue for execution. In some embodiments, users that submitted queries having at least a threshold cost can be notified and asked to throttle such queries. In some embodiments, queries having at least a threshold cost can be prevented from being executed.

Figure 3:
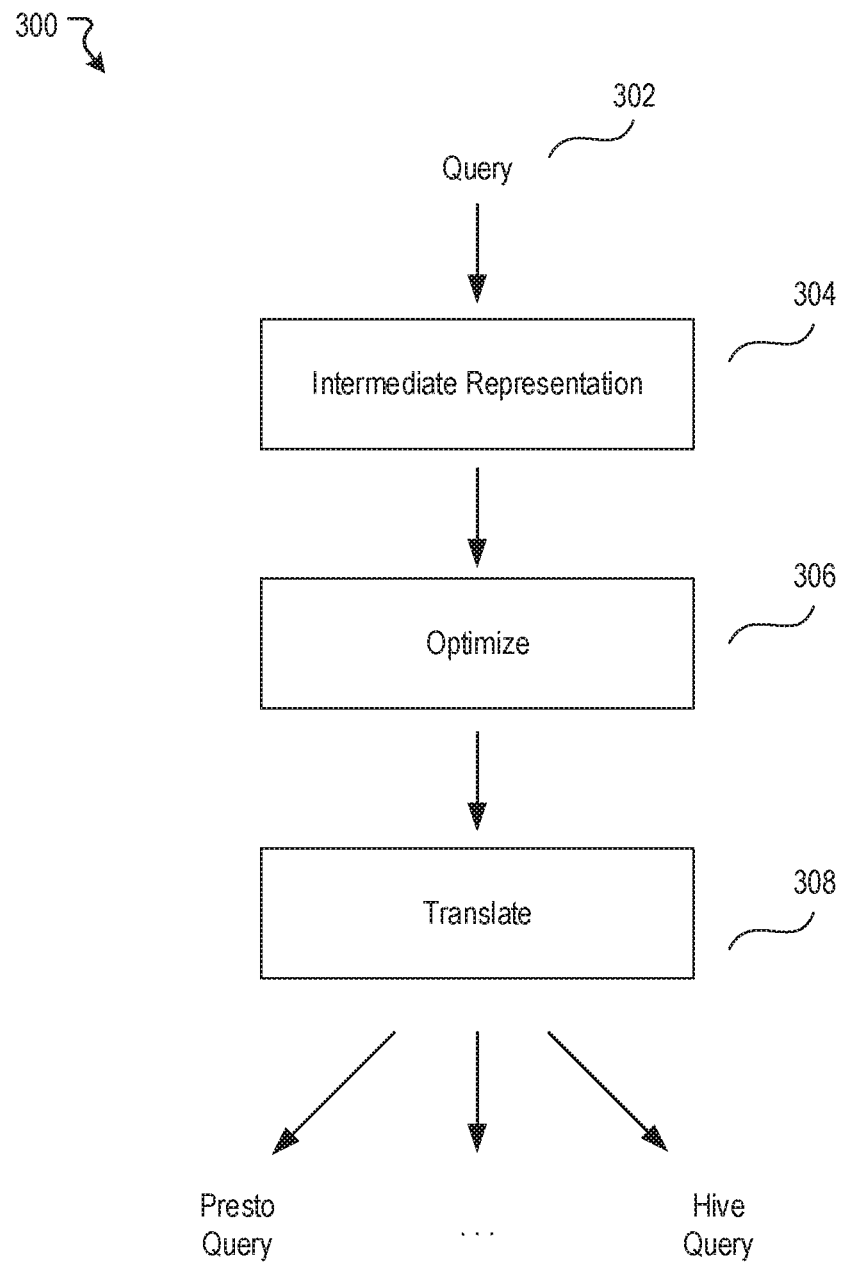
FIG. 3 illustrates an example diagram for optimizing a query, according to an embodiment of the present disclosure.

FIG. 3 illustrates an example diagram 300 for optimizing a query, according to an embodiment of the present disclosure. As mentioned, in various embodiments, queries (or requests that include queries) can be optimized to use pre-computed data. In some embodiments, various data can be pre-computed and stored automatically due to popularity and/or based on previously submitted queries, as described above. In the example of FIG. 3, a query 302 is received by a system (e.g., the social networking system 630 of FIG. 6).

The received query is then converted to an intermediate representation to determine whether the query can be optimized to use pre-computed data 304. In some embodiments, the intermediate representation corresponds to an abstract syntax tree that describes the query. If a determination is made that the query includes operations for aggregating data that has previously been computed, then the intermediate representation of the query can be optimized to use the pre-computed data 306. For example, one or more nodes corresponding to an aggregation operation in an abstract syntax tree of the query can be modified to reference the pre-computed data. Such modification helps ensure that operations for aggregating data that has already been pre-computed are not needlessly performed upon execution of the query. Once the intermediate representation has been optimized, one or more translated queries can be generated for execution by various platforms (or SQL query engines) 308. These translated queries can include Presto queries and Apache Hive queries, to name some examples.

Figure 4:
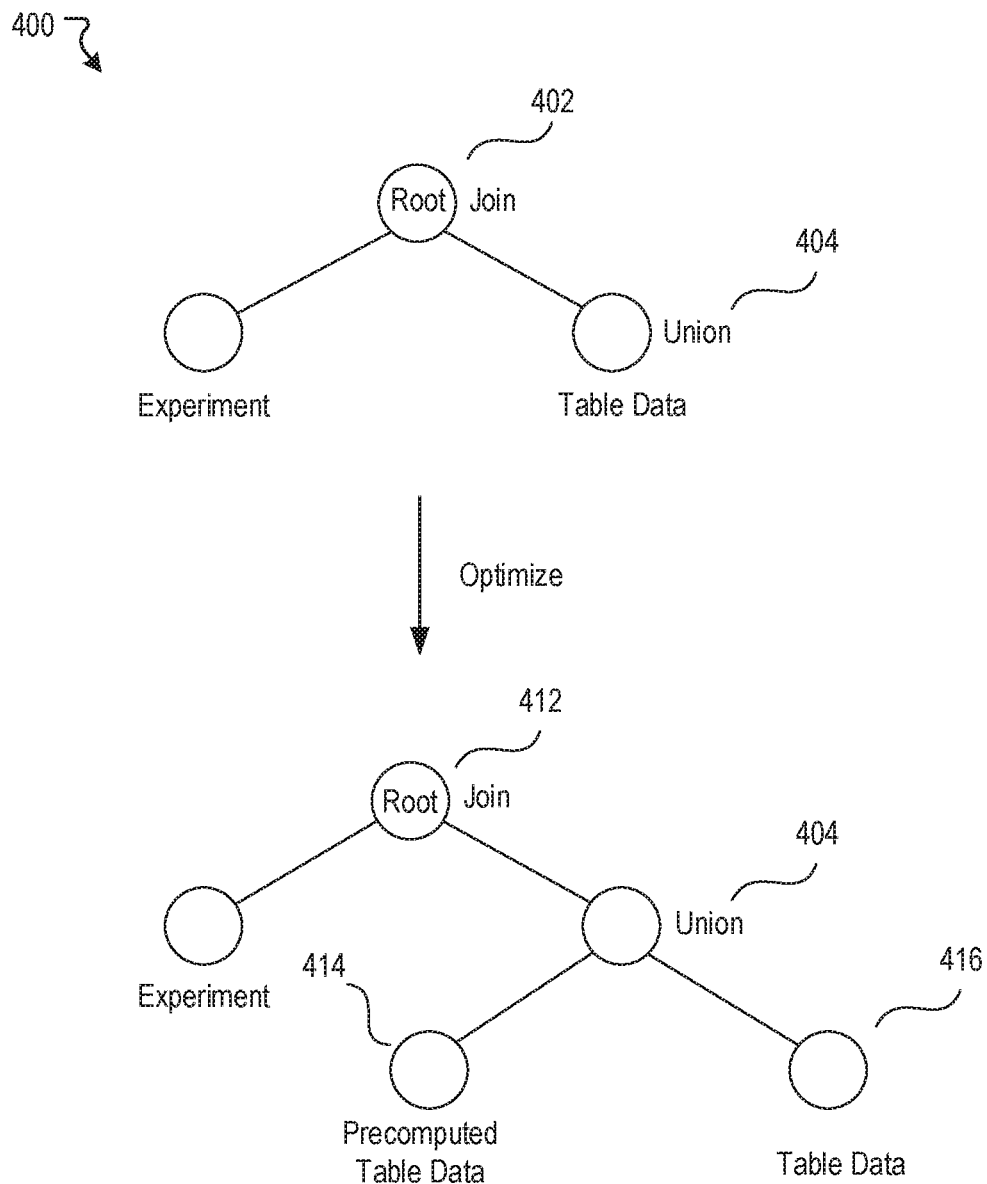
FIG. 4 illustrates another example diagram for optimizing a query, according to an embodiment of the present disclosure.

FIG. 4 illustrates another example diagram 400 for optimizing a query, according to an embodiment of the present disclosure. The example of FIG. 4 illustrates an abstract syntax tree 402 of a query that includes an operation 404 ("union") for aggregating table data. When optimizing the abstract syntax tree 402, a determination is made whether the abstract syntax tree 402 includes any nodes that correspond to an aggregation operation. Once such nodes are identified, a determination is made whether the data (or any portion of the data) being aggregated using the operation has previously been computed and stored. If such pre-computed data is available, the abstract syntax tree 402 can be modified to use the pre-computed data where possible. As mentioned, there may be instances in which no pre-computed data (or partially pre-computed data) is available for the operation. In such instances, the abstract syntax tree 402 can include one or more nodes that reference the relevant portions of the raw table data that has not been pre-computed. In the example of FIG. 4, the abstract syntax tree 402 has been optimized as the abstract syntax tree 412. The optimized abstract syntax tree 412 includes a node 404 corresponding to the aggregation operation. Further, the optimized abstract syntax tree 412 includes a sub-node 414 that references the partially pre-computed data to be utilized by the aggregation option. Moreover, the optimized abstract syntax tree 412 includes a sub-node 416 that references the raw table data that has not been pre-computed to be utilized by the aggregation option.

Figure 5:
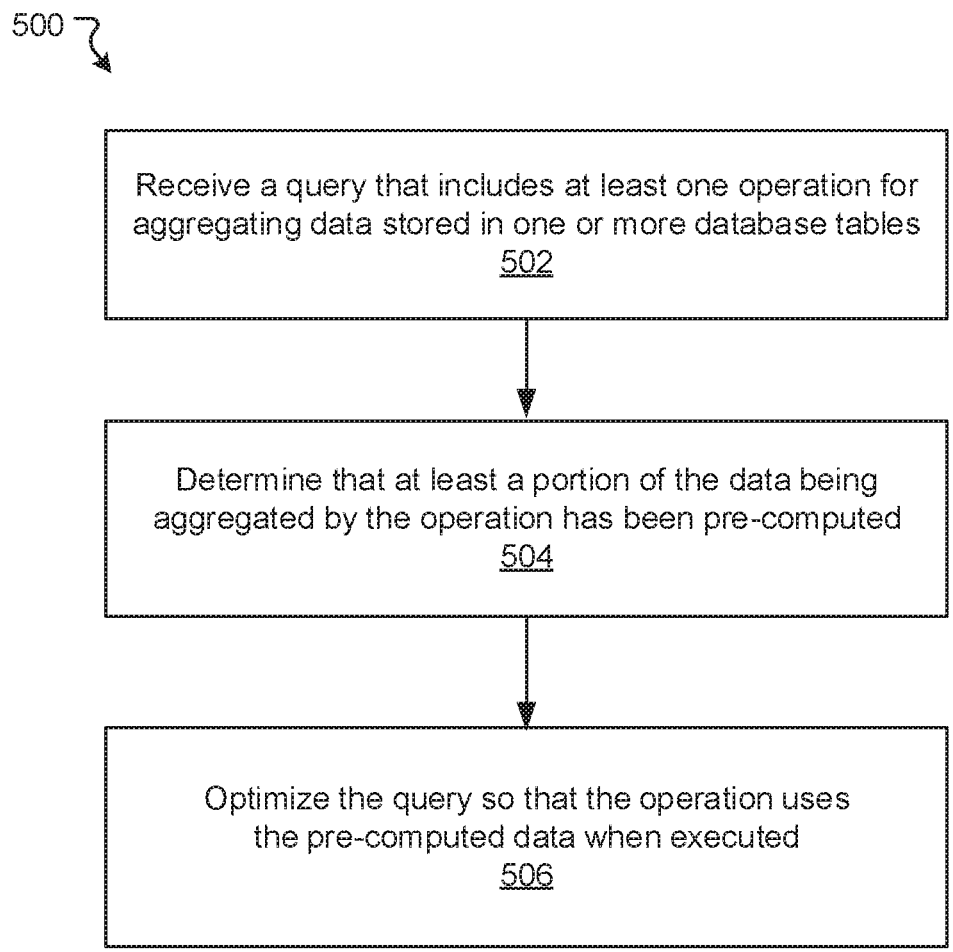
FIG. 5 illustrates an example method, according to an embodiment of the present disclosure.

FIG. 5 illustrates an example method 500 for presenting content items with external content, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a query that includes at least one operation for aggregating data stored in one or more database tables is received. At block 504, a determination is made that at least a portion of the data being aggregated by the operation has been pre-computed. At block 506, the query is optimized so that the operation uses the pre-computed data when executed.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
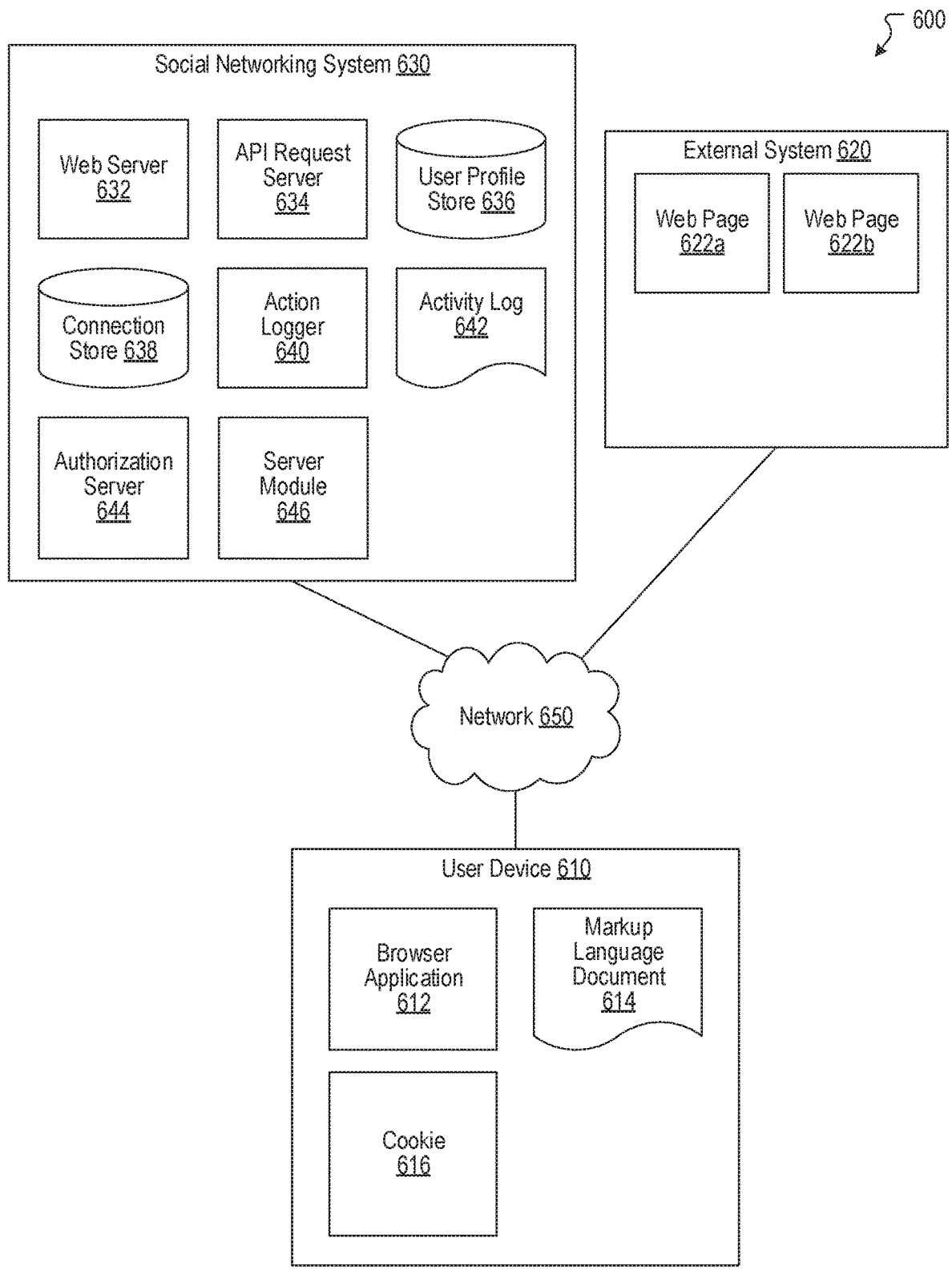
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 and/or the social networking system 630 can include a server module 646. The server module 646 can, for example, be implemented as the server module 102 of FIG. 1. As discussed previously, it should be appreciated that there can be many variations or other possibilities.

Hardware Implementation

Figure 7:
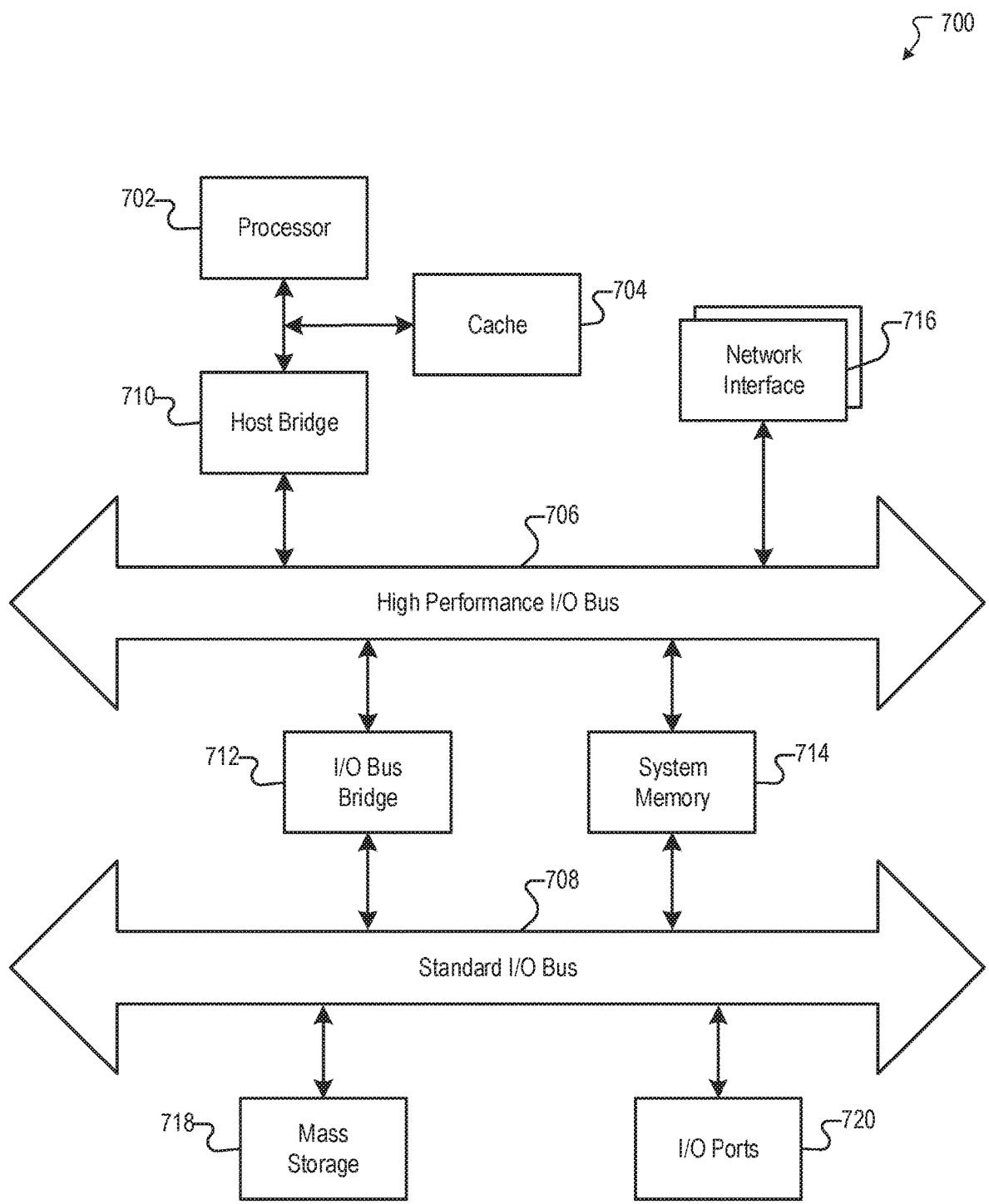
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a query that includes at least one operation for aggregating data stored in one or more database tables;
    determining, by the computing system, that at least a portion of the data being aggregated by the operation has been pre-aggregated,
        wherein the data was pre-aggregated in response to a number of previous queries that aggregated the data, the number of previous queries that aggregated the data satisfying a threshold number; and
    optimizing, by the computing system, the query so that the operation uses the pre-aggregated data when executed.

2. The computer-implemented method of claim 1, wherein the operation for aggregating data corresponds to an average function, a count function, a maximum function, a minimum function, a median function, a sum function, or a union function.

3. The computer-implemented method of claim 1, wherein optimizing the query so that the operation uses the pre-aggregated data when executed further comprises:
    generating, by the computing system, an intermediate representation of the query; and
    modifying, by the computing system, the intermediate representation of the query to reference the pre-aggregated data.

4. The computer-implemented method of claim 3, wherein the intermediate representation of the query corresponds to an abstract syntax tree that describes the query, and wherein one or more nodes in the abstract syntax tree are modified to reference the pre-aggregated data.

5. The computer-implemented method of claim 1, the method further comprising:
    generating, by the computing system, a translated version of the query for execution by a given SQL query engine.

6. The computer-implemented method of claim 5, wherein the translated version of the query corresponds to an Apache Hive query or a Presto query.

7. The computer-implemented method of claim 1, wherein the data was pre-aggregated in response to the data being aggregated by one or more scheduled queries.

8. The computer-implemented method of claim 1, the method further comprising:
    determining, by the computing system, that a cost estimate for running the query satisfies a threshold value; and
    preventing, by the computing system, the query from being executed.

9. A system comprising:
    at least one processor; and
    a memory storing instructions that, when executed by the at least one processor, cause the system to perform:
        receiving a query that includes at least one operation for aggregating data stored in one or more database tables;
        determining that at least a portion of the data being aggregated by the operation has been pre-aggregated, wherein the data was pre-aggregated in response to a number of previous queries that aggregated the data, the number of previous queries that aggregated the data satisfying a threshold number; and optimizing the query so that the operation uses the pre-aggregated data when executed.

10. The system of claim 9, wherein the operation for aggregating data corresponds to an average function, a count function, a maximum function, a minimum function, a median function, a sum function, or a union function.

11. The system of claim 9, wherein optimizing the query so that the operation uses the pre-aggregated data when executed further comprises:

generating an intermediate representation of the query; and modifying the intermediate representation of the query to reference the pre-aggregated data.

12. The system of claim 11, wherein the intermediate representation of the query corresponds to an abstract syntax tree that describes the query, and wherein one or more nodes in the abstract syntax tree are modified to reference the pre-aggregated data.

13. The system of claim 9, the method further comprising:

generating a translated version of the query for execution by a given SQL query engine.

14. A non-transitory computer-readable storage medium including instructions that, when executed by at least one processor of a computing system, cause the computing system to perform a method comprising:

receiving a query that includes at least one operation for aggregating data stored in one or more database tables;

determining that at least a portion of the data being aggregated by the operation has been pre-aggregated, wherein the data was pre-aggregated in response to a number of previous queries that aggregated the data, the number of previous queries that aggregated the data satisfying a threshold number; and optimizing the query so that the operation uses the pre-aggregated data when executed.

15. The non-transitory computer-readable storage medium of claim 14, wherein the operation for aggregating data corresponds to an average function, a count function, a maximum function, a minimum function, a median function, a sum function, or a union function.

16. The non-transitory computer-readable storage medium of claim 14, wherein optimizing the query so that the operation uses the pre-aggregated data when executed further comprises:

generating an intermediate representation of the query; and modifying the intermediate representation of the query to reference the pre-aggregated data.

17. The non-transitory computer-readable storage medium of claim 16, wherein the intermediate representation of the query corresponds to an abstract syntax tree that describes the query, and wherein one or more nodes in the abstract syntax tree are modified to reference the pre-aggregated data.

18. The non-transitory computer-readable storage medium of claim 14, the method further comprising:

generating a translated version of the query for execution by a given SQL query engine.

19. The computer-implemented method of claim 1, wherein the data was pre-aggregated in response to at least one previous query that required an amount of time to execute, the amount of time to execute satisfying a threshold amount of time.

* * * * *